United States Patent [19]

Garin

[11] 4,078,969

[45] Mar. 14, 1978

[54] CORE DISRUPTIVE ACCIDENT MARGIN SEAL

[75] Inventor: John Garin, Oak Ridge, Tenn.

[73] Assignee: The United States Government as represented by the U. S. Department of Energy, Washington, D.C.

[21] Appl. No.: 714,221

[22] Filed: Aug. 13, 1976

[51] Int. Cl.² .............................................. G21C 15/02
[52] U.S. Cl. ........................................ 176/87; 176/37; 137/251
[58] Field of Search ................... 176/37, 87; 137/246, 137/251

[56] References Cited

U.S. PATENT DOCUMENTS

| 3,522,144 | 7/1970 | Webb et al. | 176/87 X |
| 3,713,461 | 1/1973 | Noteltiers | 137/246 X |
| 3,819,478 | 6/1974 | Thorel et al. | 176/87 |
| 3,867,254 | 2/1975 | Brandstetter | 170/87 |
| 3,926,722 | 12/1975 | Dupen | 176/87 |

Primary Examiner—Peter A. Nelson
Attorney, Agent, or Firm—L. A. DePaul; Z. L. Dermer

[57] ABSTRACT

An apparatus for sealing the annulus defined between a substantially cylindrical rotatable first riser assembly and plug combination disposed in a substantially cylindrical second riser assembly and plug combination of a nuclear reactor system. The apparatus comprises a flexible metal member having a first side attached to one of the riser components and a second side extending toward the other riser component and an actuating mechanism attached to the flexible metal member while extending to an accessible location. When the actuating mechanism is not activated, the flexible metal member does not contact the other riser component thus allowing the free rotation of the riser assembly and plug combination. When desired, the actuating mechanism causes the second side of the flexible metal member to contact the other riser component thereby sealing the annulus between the components.

10 Claims, 8 Drawing Figures

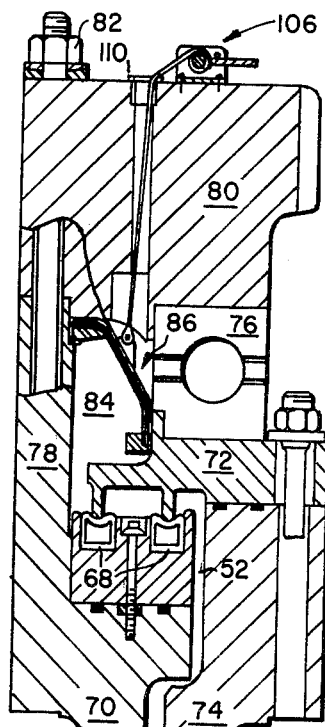
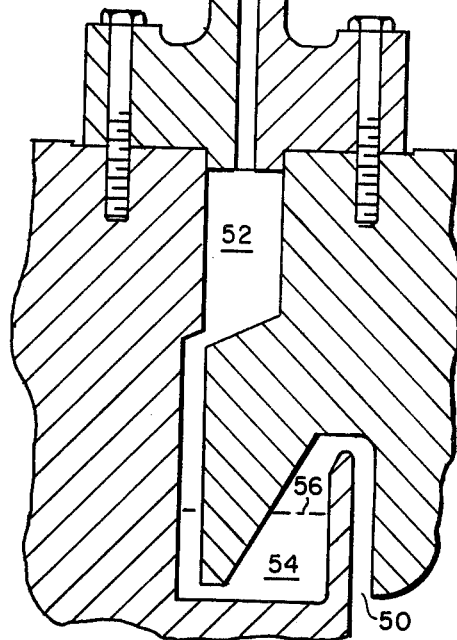
FIG. 2

CORE DISRUPTIVE ACCIDENT MARGIN SEAL

GOVERNMENT CONTRACT

The invention described herein was made in the course of, or under, contract No. E(11-1)2395 with the U.S. Energy Research and Development Administration.

CROSS-REFERENCE TO RELATED APPLICATIONS

The invention herein disclosed is related to copending application Ser. No. 714,220, filed concurrently herewith, entitled "Core Disruptive Accident Margin Seal," by J. Garin and J. C. Belsick which is assigned to the present assignee.

BACKGROUND OF THE INVENTION

This invention relates to seals and more particularly to seals for components of closure heads of nuclear reactors.

In nuclear reactor designs, well known in the art, a reactor vessel with fuel assemblies disposed therein, and having an inlet and an outlet for circulation of a coolant in heat transfer relationship with the fuel assemblies, is sealed by a closure head located on top of the reactor vessel. In certain designs, the closure head comprises one or more rotatable plugs. These rotatable plugs, which may be of varying sizes disposed eccentrically within each other, serve at least two purposes. One purpose is, of course, to seal the reactor internals inside the reactor vessel. Another purpose is to support refueling machines. The rotation of the rotatable plugs positions the refueling machines in appropriate relationship to the fuel assemblies in the reactor vessel to facilitate the refueling process. Since the rotatable plugs must be able to rotate relative to each other, the plugs are mounted so as to define an annulus between them. The annulus, while allowing the rotation of the plugs, also establishes a path for the release of radio-active particles located in the reactor vessel. Accordingly, seals are provided at various locations across the annulus to prevent this release of radioactive particles. The seals also function to prevent oxygen in the atmosphere outside the reactor vessel from passing through the annulus to the reactor coolant which in a liquid metal fast breeder reactor may be liquid sodium because contact of liquid sodium with oxygen may result in a violent reaction. To further prevent oxygen leakage into the reactor vessel, a cover gas is provided that fills the space from the top of the reactor coolant pool to the bottom of the closure head and up the annulus to the seals across the annulus.

In the process of designing such liquid metal fast breeder reactors, it is common practice to analyze the effectiveness of the closure head seals under extreme conditions that are highly unlikely to occur to thereby assure the effectiveness of such seals under normal conditions. During the course of such design the seals are subjected to a sophisticated analysis which determines the seal response under a hypothetical core disruptive accident (CDA), theoretically the worst possible accident. Typically, the CDA is hypothesized to be a case in which, for whatever reason, a void violently propagates in the reactor coolant causing a violent expansion of the reactor coolant which in turn forces the cover gas up the annulus between the closure head plugs where the cover gas and liquid sodium are hypothesized to impact the closure head seals which are across the annulus. To meet design requirements, the seals must be able to contain the cover gas and liquid sodium which will have radioactive particles therein in order to prevent a release of radioactive particles to outside the reactor vessel. There are several kinds of effective closure head seals known in the art.

One type of closure head seal well known to those skilled in the art is a liquid dip seal. In a liquid dip seal, the annulus between the closure head plugs is contoured so that a trough is formed by the annulus itself. A liquid such as liquid sodium is placed in the trough thereby dividing the annulus into two sections, one above the liquid and one below. The cover gas, inside the reactor, containing radioactive particles then extends from the top of the reactor coolant pool up through the annulus to the liquid sodium in the dip seal. The liquid dip seal under normal conditions provides an effective seal against cover gas migration out of the annulus and against oxygen migration into the reactor vessel while allowing the rotatable closure head plugs to rotate relative to each other. However, under the CDA analysis, the expansion of the reactor coolant could force the cover gas up the annulus in a violent manner. In the process, the cover gas could expel the liquid sodium from the dip seal onto seals and bearings located in the annulus above the dip seal, thereby rendering the liquid dip seal ineffective under such hypothesized conditions.

Another type of closure head seal well known in the art is the inflatable seal wherein single or multiple inflatable seals in series are placed across the annulus in a manner well known in the art. During reactor refueling, the inflatable seals are slightly deflated to allow better rotation of the rotatable closure head plugs while during reactor operation the seals are inflated to increase their sealing capability. While inflatable seals are effective under normal conditions, their effectiveness under a CDA analysis is sometimes questioned.

Still another seal well known in the art and designed specifically for CDA conditions is a type of labyrinth seal in which a piece of metal is bolted to one of the closure head plugs so as to extend across the annulus between the plugs to within close proximity to the other plug. The purpose of this seal is to effectively lower the leak path area to thus limit leakage under CDA. However, when subjected to analysis this seal while theoretically reducing leakage and allowing plug rotation does not completely solve the problem of preventing release of radioactive particles under severe reactor conditions such as CDA.

In addition, the other commonly known types of seals such as O-rings, bellows, etc., while possibly effective under CDA conditions, do not allow for effective rotation of the closure head plugs.

SUMMARY OF THE INVENTION

An apparatus for sealing the annulus defined between a substantially cylindrical rotatable first component disposed in a substantially cylindrical second component of a nuclear reactor system. The apparatus comprises a flexible metal member having a first side attached to one of the rotatable components and a second side extending toward the other component. The flexible metal member has slots therein that extend from its second side toward its first side which provide the flexible metal member with a capability to expand or contract without developing intolerable stresses therein. An elastomer coating may be bonded to the flexible metal member in a manner so as to cover the slots in the flexible metal member and create a sealing capability. The apparatus further comprises an actuating mechanism attached to the flexible metal member while extending to an accessible location. When the actuating mechanism is not actuated, the flexible metal member does not contact the other component thus allowing the free rotation of the components. When desired, the actuating mechanism causes the second side of the flexible metal member to contact the other component thereby sealing the annulus between the components. The elastomer coating may extend around the second side of the flexible metal member so as to be disposed between the flexible metal member and the other component thereby increasing the sealing capability of the apparatus.

It is an object of this invention to provide a flexible metal seal attached to a component of a nuclear reactor closure head and capable of being drawn substantially laterally tightly against another such component by an actuating mechanism located on one of the components for sealing the annulus between the components under severe reactor conditions while allowing rotation of those components under normal reactor conditions.

It is a more particular object of this invention to provide a flexible metal seal having an elastomer layer attached to a component of a nuclear reactor closure head and capable of being drawn substantially laterally tightly against another such component by an actuating mechanism located on one of the components under severe reactor conditions while allowing rotation of those components under normal reactor conditions.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

FIG. 2 is a cross-sectional view in elevation of a typical riser assembly with the invention;

DESCRIPTION OF THE PREFERRED EMBODIMENT

In designs of nuclear reactors that utilize rotatable plugs in the closure head of the reactor vessel, there exist annular passageways defined between the rotatable plugs and associated apparatus which allow the rotation of the plugs. In order to meet strict design requirements, seals must be provided that are capable of sealing these passageways under severe reactor conditions. The invention described herein serves to seal those kinds of passageways.

Figure 1:
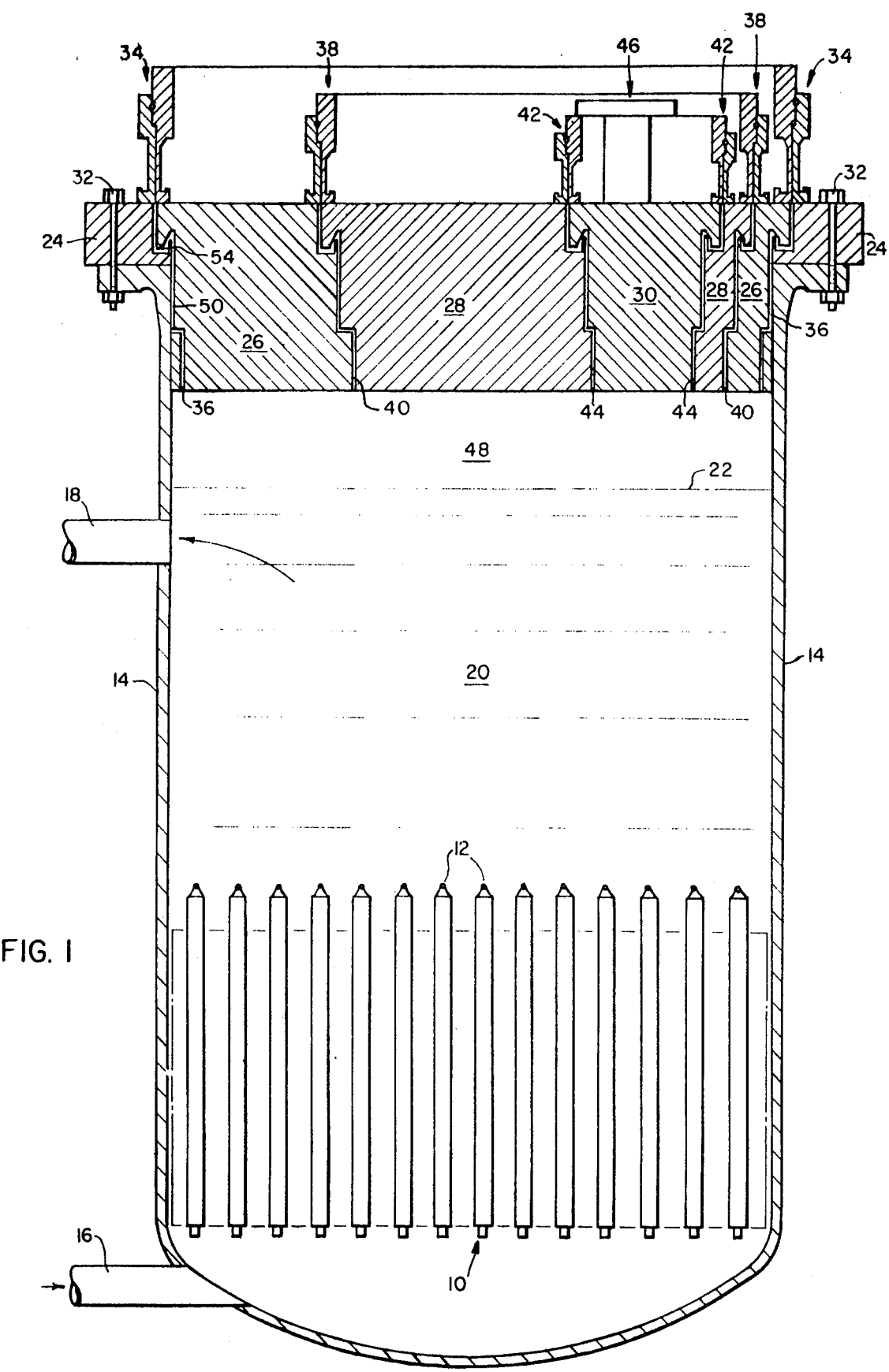
FIG. 1 is a cross-sectional view in elevation of a typical nuclear reactor.

Referring to FIG. 1, a core 10 comprising fuel assemblies 12 that produce heat is contained within a reactor vessel 14. The reactor vessel 14 has an inlet 16 and an outlet 18 that permit a coolant 20 to circulate in a heat transfer relationship with the fuel assemblies 12. The coolant 20, which in a fast breeder reactor may be liquid sodium, fills the reactor vessel 14 to a coolant level 22. The reactor vessel 14 is closed at its top end by a closure head comprising a stationary outer ring 24, a large rotatable plug 26, an intermediate rotatable plug 28, and a small rotatable plug 30. The stationary outer ring 24 may be attached to the reactor vessel by bolts 32 or other suitable means known in the art. The large rotatable plug 26 is supported from the stationary outer ring 24 by large riser assembly 34. The outer peripheral surface of large rotatable plug 26 together with the inner peripheral surface of stationary outer ring 24 define an annulus 36 therebetween. The large riser assembly 34 which contains bearings, seals, and a plug drive mechanism (not shown) enables the large rotatable plug 26 to move relative to stationary outer ring 24 while maintaining a fluid-tight boundary between the outside and inside of reactor vessel 14. In addition, the large riser assembly 34 locates the bearings, seals, and drive mechanism away from the hot surface of the large rotatable plug 26 thus providing a cooler operating environment and thus allowing a greater range of selectivity of bearings, seals, and drive mechanism materials.

Again referring to FIG. 1, intermediate rotatable plug 28 is disposed eccentrically within large rotatable plug 26 and supported by intermediate riser assembly 38 defining an annulus 40 therebetween in a manner similar to that of the large riser assembly 34. Likewise, the small rotatable plug 30 is similarly eccentrically disposed within intermediate rotatable plug 28 and supported by small riser assembly 42 defining an annulus 44 therebetween. In addition, small rotatable plug 30 has disposed therein an in-vessel transfer collar 46 which provides access for an in-vessel transfer machine (not shown). During refueling, an in-vessel transfer machine which may be chosen from those well known in the art, is placed in the bore of the in-vessel transfer collar 46. When the in-vessel transfer machine is in place in the in-vessel transfer collar 46, a selected combination of rotations of the three rotatable plugs 26, 28, 30 will align the in-vessel transfer machine in appropriate relationship with a chosen fuel assembly 12 of the core 10. As well known in the art, the in-vessel transfer machine may then remove the chosen fuel assembly from the core and replace it with a fresh fuel assembly.

When the reactor coolant 20 is liquid sodium, as in the case of liquid metal fast breeder reactors, it is necessary to avoid contact of the liquid sodium with oxygen because this interaction will result in a violent reaction. To thus avoid this interaction, the space between the bottom of the closure head and the coolant level 22 is filled with a cover gas 48 such as argon. The cover gas 48 not only fills the cover gas space between the bottom of the closure head and the top of the coolant level 22, but it also fills the annuli 36, 40, 44. While the cover gas 48 prevents oxygen from contacting the coolant 20, the cover gas 48 itself is subjected to radiation exposure from the core and thus becomes contaminated with radioactive particles. It is, therefore, necessary to have the cover gas 48 circulated between the reactor vessel and a cleaning process to remove most of the radioactive particles in a manner well known in the art. As previously indicated, it is, nevertheless, necessary to prevent this cover gas 48 from escaping up the annuli 36, 40, 44 through the seals in the closure head, and out of the reactor vessel.

FIG. 2 represents a typical riser assembly which is similar to the riser assemblies 34, 38 and 42. The annuli 36, 40 and 44 are represented by a typical annulus which is divided into two portions 50 and 52. Dividing the lower annulus 50 from the upper annulus 52 is a dip seal 54 which may be chosen from those well known in the art, such as a liquid sodium dip seal. The cover gas 48 fills the lower annulus 50 up to the dip seal level 56. The liquid sodium in dip seal 54 will prevent the contaminated cover gas 48 from migrating from the lower annulus 50 into the upper annulus 52. However, increased cover gas pressure may force cover gas 48 to bubble through dip seal 54 which may result in a small amount of cover gas 48 being released into the upper annulus 52. Under normal reactor conditions, the dip seals 54 can be effective against release of radioactive particles while allowing the rotation of the rotatable plugs.

Again referring to FIG. 2, in order to seal the upper annulus 52 from the atmosphere as a further protection from both oxygen in-leakage and cover gas out-leakage, two inflatable elastomer seals 68 are arranged in series on inner riser 70 in a manner well known in the art. A forked member 72 is disposed on the outer riser assembly 74 in a manner so as to contact inflatable seals 68 thereby sealing the upper annulus 52. In addition, inner riser 70 is supported from the outer riser assembly 74 by bearing 76 to permit relative rotation between the riser assemblies as the plugs rotate. A lubricant which may be chosen from those well known in the art may be applied to the inflatable seals 68 to insure proper sealing between inflatable seals 68 and forked member 72. During reactor operation the inflatable seals 68 are inflated so that the inflatable seals 68 conform to the surface of forked member 72 and the seating area of the seals thereby increasing contact between the inflatable seals 68 and forked member 72 thus increasing the sealing effect. However, during refueling of the reactor it is necessary to rotate the rotatable plugs. Rotation of the rotatable plugs requires rotation of the inner riser 70 relative to the outer riser 74, which in turn, means that there must be relative rotational motion between forked member 72 and inflatable seals 68. To aid this rotational motion, the inflatable seals 68 are slightly deflated just prior to the time plug rotation takes place.

While the liquid dip seal 54 and inflatable seals 68 are effective under normal reactor conditions, under CDA (Core Disruptive Accident) analysis it is hypothesized that they may not provide complete protection against the leakage of gas or radioactive particles into or from the reactor. The hypothesis of the CDA is that the reactor coolant 20 is violently forced upwardly toward the bottom of the closure head which in turn forces cover gas 48 up the lower annulus 50. Cover gas 48, under pressure from the reactor coolant force, expels the liquid sodium from dip seal 54 through upper annulus 52 and past the inflatable seals 68. Under CDA hypothesis, it is further hypothesized that the liquid sodium and cover gas passing by inflatable seals 68 will escape from the riser assembly through small gaps around bearing 76. The invention described herein is a further protection against such a release from the riser assemblies.

Figure 3:
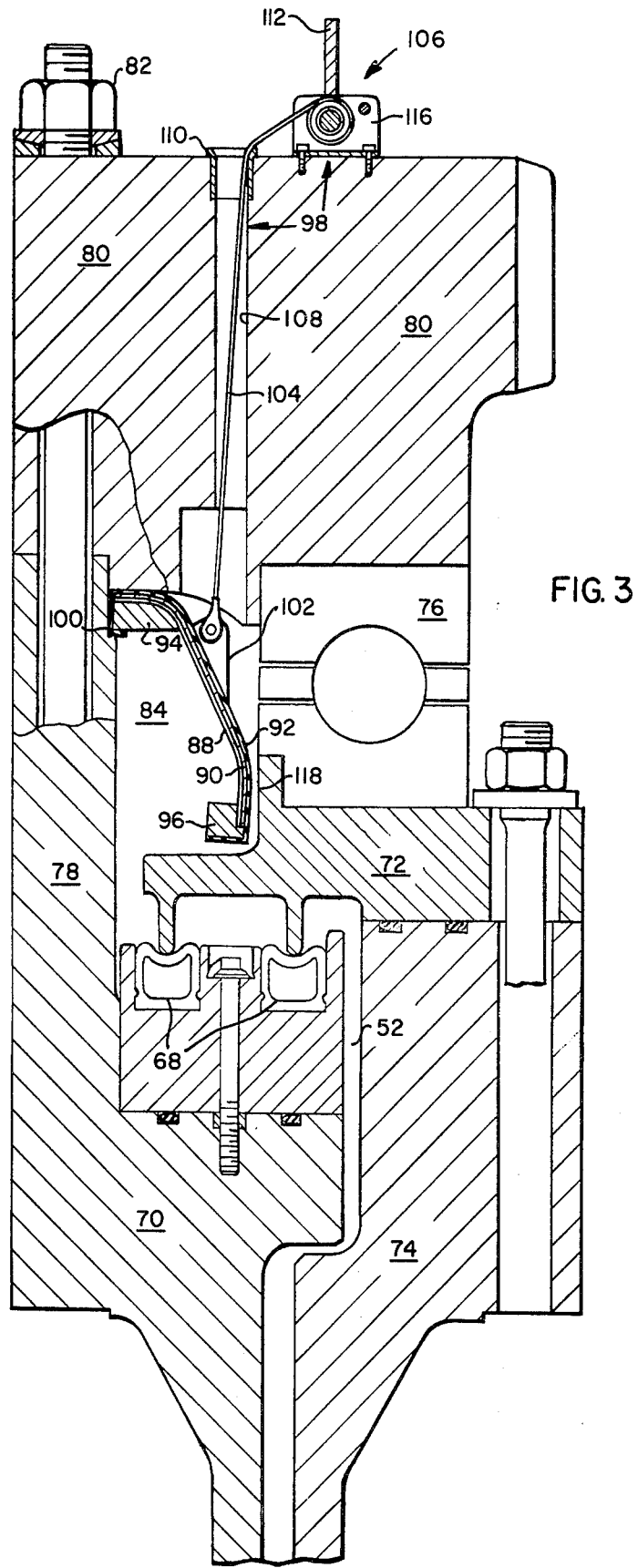
FIG. 3 is a cross-sectional view in elevation of a typical riser assembly showing the invention in detail in the non-actuated position.

Referring now to FIG. 3, the upper portion of the inner riser 70 is divided into two portions, riser segment 78 and gear segment 80. Generally, riser segment 78 is an integral part of inner riser 70 while gear segment 80, which is connected to gears and drive mechanisms (not shown) that allow plug rotation, may be a separable component. Gear segment 80 may be removed from riser segment 78 by releasing bolts 82. Removal of gear segment 80 provides access to bearing 76 and annular cavity 84 which is the portion of upper annulus 52 above inflatable seals 68 and near bearing 76.

Disposed in annular cavity 84 is a margin seal 86. Margin seal 86 comprises a first flexible metal member 88, a second flexible metal member 90, an elastomer layer 92, a first ring 94, a second ring 96, and an actuating mechanism 98. First flexible metal member 88 and second flexible metal member 90 may be sheets of flexible stainless steel formed to conform to annular cavity 84 as shown in FIG. 3. At the first ends thereof, first flexible metal member 88 and second flexible metal member 90 are attached to first ring 94 while the second ends are attached to second ring 96. The second end of the flexible metal members 88 and 90 have slots therein that extend near to first ring 94 which allows the flexible metal members 88 and 90 to move under the action of actuating member 98 without developing high stresses therein. Elastomer layer 92, which may be Parker Silicone No. S-604-70, may be bonded to one flexible metal member in a manner well known in the art as shown in FIG. 3 or elastomer layer 92 may be bonded to both flexible metal members on each side thereof. When bonded to the flexible metal members 88 and 90, first ring 94, and second ring 96, elastomer layer 92 serves to seal the slots in the flexible metal members while not hampering their movement.

Again referring to FIG. 3, first ring 94 with elastomer layer 92 attached thereto is disposed in notch 100 of riser segment 78. Once placed in notch 100, gear segment 80 is placed onto riser segment 78 and bearing 76 and bolted in place by bolts 82. In this position the bottom edge of riser segment 80 rests on elastomer layer 92 near notch 100 holding first ring 94 firmly in notch 100 while pressing elastomer layer 92 between first ring 94 and notch 100, thereby forming a tight seal in that area of annular cavity 84.

Figure 4:
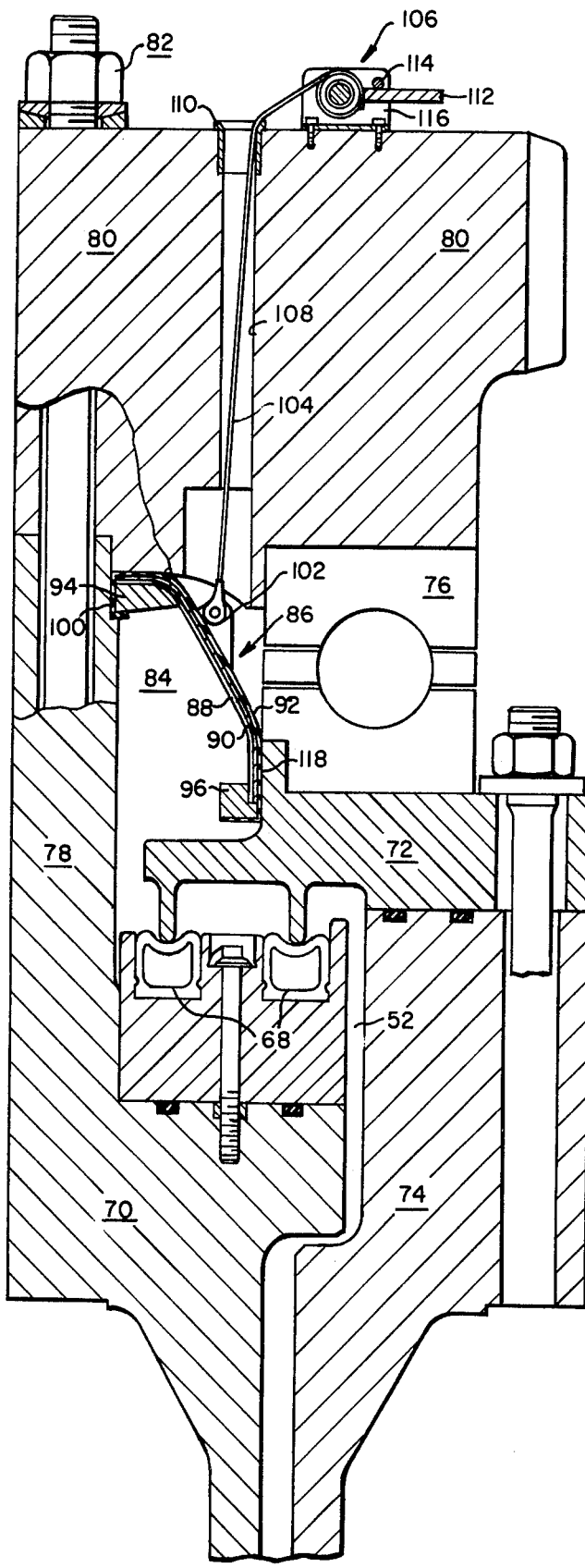
FIG. 4 is a cross-sectional view in elevation of a typical riser assembly showing the invention in detail in the actuated position.

Actuating mechanism 98 as shown in FIGS. 3 and 4 comprises an attachment 102, a wire 104 and a latch 106, all of which may be constructed of stainless steel. Attachment 102 is fastened to first flexible metal member 90 and wire 104 is connected to attachment 102, both in a manner well known to those skilled in the art. Wire 104 extends from attachment 102 through bore 108 in gear segment 80 to latch 106 which is disposed on the top of gear segment 80. A bushing 110 is disposed in the top of bore 108 in a manner such that wire 104 extends therethrough and rests on the lip of bushing 110.

Figure 6:
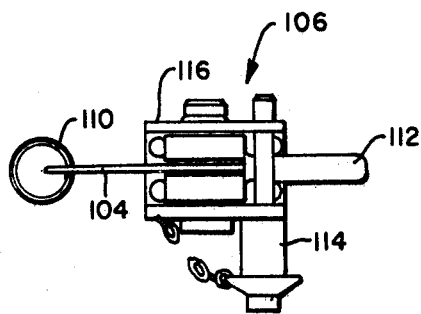
FIG. 6 is a plan view of the mechanical latch.
Figure 7:
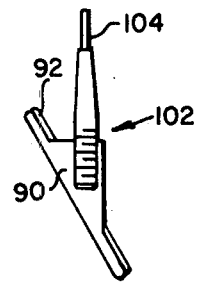
FIG. 7 is a diagram of an alternate attachment for the actuating mechanism.
Figure 8:
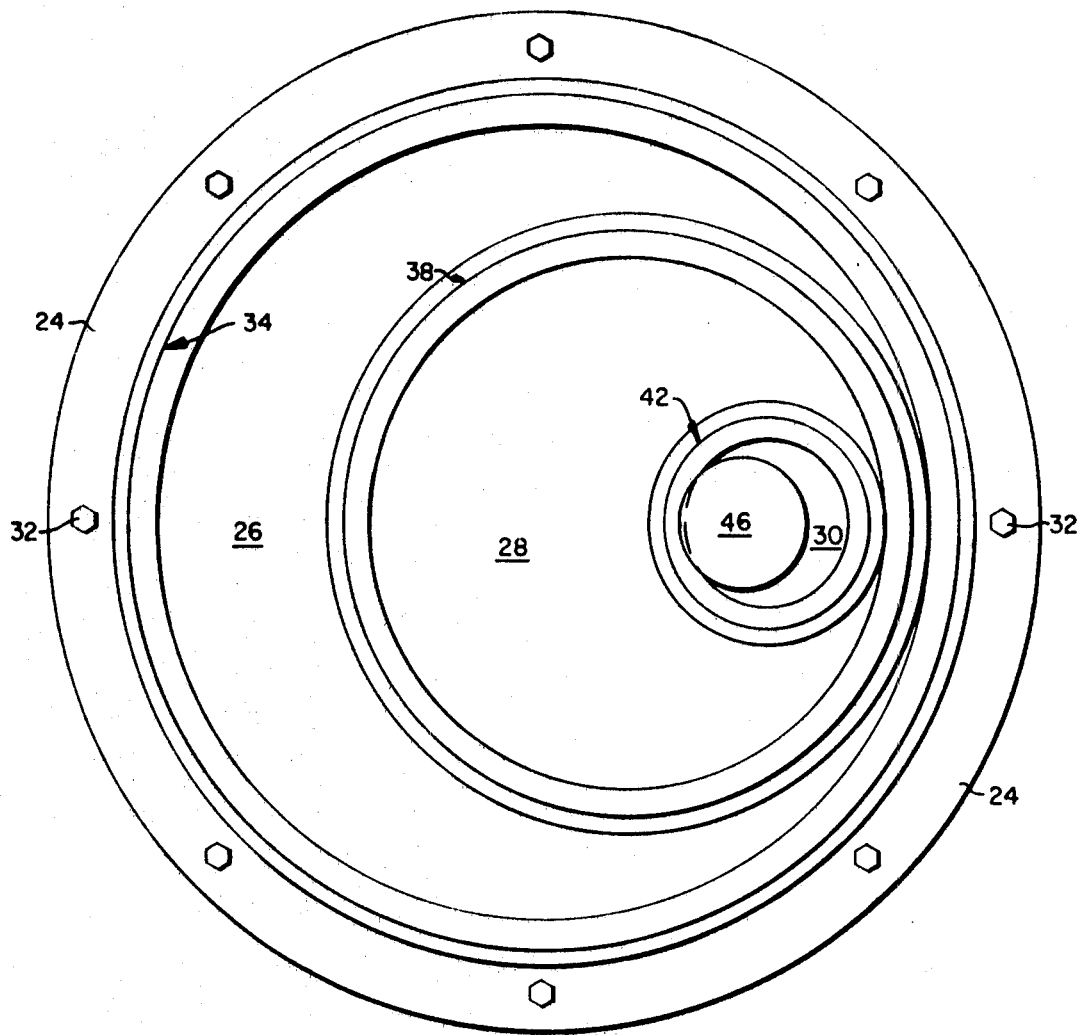
FIG. 8 is a plan view of the nuclear reactor shown in FIG. 1.

Referring now to FIG. 6, latch 106 consists of a pivoting device 112, a locking pin 114 and a housing 116. Pivoting device 112 is disposed in housing 116 so that pivoting device 112 may pivot about a horizontal axis. Wire 104 is attached to pivoting device 112 such that when pivoting device 112 is pivoted into the actuated position of FIG. 6, wire 104 is drawn upward, thereby actuating margin seal 86. When in the actuated position of FIG. 6, locking pin 114 may be placed through housing 116 in a manner so as to hold pivoting device 112 in the actuated position. Release of locking pin 114 will also allow pivoting device 112 to pivot back into the unactuated position as shown in FIG. 3. Of course, latch 106 may be operated either manually or electrically in a manner well known in the art.

OPERATION

Figure 5:
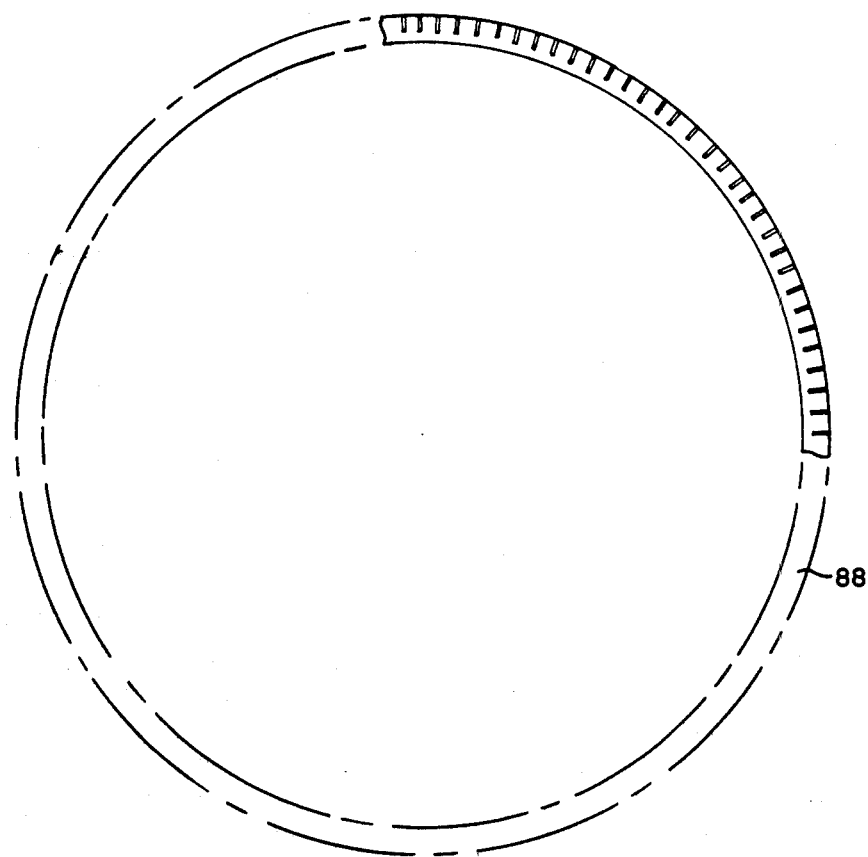
FIG. 5 is a plan view of a flexible metal member showing the slots therein.

During reactor refueling when it is necessary to rotate the closure head plugs and riser assemblies attached thereto with relative ease in order to position refueling machines in appropriate relationship to the core as is well known in the art, the actuating mechanism 98 is placed in the non-actuated position as shown in FIG. 3. When in this non-actuated position, the torsion spring stiffness of first ring 94 and the manner of mounting the margin seal 86 in notch 100 along with the slack in wire 104 cause margin seal 86 to be in a non-contacting relationship with the ledge 118 of forked member 72. In this position inner riser 70 may rotate, without hindrance, relative to outer riser 74 and forked member 72 attached thereto. However, during reactor operation when it is not necessary to rotate the closure head plugs and riser assemblies attached thereto, actuating mechanism 98 can actuate margin seal 86 as shown in FIG. 4. When actuated, pivoting device 112 is pivoted such that wire 104 is drawn taut, which in turn, pulls the flexible metal members 88 and 90 with elastomer layers 92 bonded thereto into close contact with ledge 118. Second ring 96 causes a uniform pressure to be distributed on elastomer layer 92 all along the circumferential perimeter of ledge 118 thereby forming a tight seal between the atmosphere outside the riser assembly and inside upper annulus 52. Not only does margin seal 86 form an effective gas seal, but under CDA conditions, margin seal 86 can also seal under the impact of hot liquid sodium. Furthermore, should liquid sodium and cover gas be forced through upper annulus 52 onto margin seal 86 at a high impact, the flexible metal members 88 and 90 are capable of deforming plastically against bearing 76, gear segment 80, and ledge 118 to absorb such impact while increasing the sealing capability, thus preventing escape of radioactive particles in the sodium and cover gas so impacting while also accommodating relative vertical motions between inner riser 70 and outer riser 74. This plastic deformation capability is achieved by constructing the flexible metal members 88 and 90 out of stainless steel of a proper thickness and with slots therein as previously described and shown in FIG. 5. In addition, the elastomer layer 92 covers the slots in flexible metal members 88 and 90 and forms a seal between those flexible metal members and ledge 118 so that there is no leakage past margin seal 86 under these conditions. Therefore, the invention herein described provides an apparatus capable of effectively sealing an annulus between rotatable components of a nuclear reactor against expulsion of liquid sodium and gases under severe reactor conditions while allowing rotation of those components under normal reactor conditions.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, the elastomer layer of the margin seal may be on either or both sides of the flexible metal members. Also, under appropriate circumstances, there need not be an elastomer layer present. Furthermore, the actuating mechanism may be electrically controlled.

I claim:

1. A nuclear reactor system including a vessel, fuel assemblies positioned therein, an inlet and an outlet for circulating a coolant in heat transfer relationship with said fuel assemblies, and a closure head disposed on said vessel in a fluid-tight relationship, said closure head comprising:
   seal means disposed across a first annulus defined between a first and a second component of said closure head and having one end attached to said first component, and extending across said first annulus to a second end not contacting said second component when not actuated for sealing said first annulus when actuated while allowing free rotation of said components with respect to each other when not actuated; and
   actuating means attached to said seal means for pulling said seal means into contact with said second component for sealing said first annulus.

2. The system recited in claim 1 wherein said seal means comprises:
   a first flexible metal member having a first end attached to said first component and extending across said first annulus to a second end not contacting said second component when not actuated.

3. The system recited in claim 2 wherein said first flexible metal member has slots therein extending from said second end to near said first end for allowing circumferential expansion of said first flexible metal member without developing high stresses therein.

4. The system recited in claim 3 wherein said seal means further comprises:
   an elastomer layer disposed on said first flexible metal member covering said slots to prevent leakage therethrough while allowing said expansion and improving the seal between said first end and said first component and between said second end and said second component.

5. The system recited in claim 4 wherein said seal means further comprises:
   a first ring attached to said first end of said first flexible metal member for increasing the tension in said first flexible metal member when actuated by said actuating means thereby causing said second end of said first flexible member to be in a non-contacting relationship with said second component when said actuating means is not actuated; and
   a second ring attached to said second end of said first flexible metal member for applying a substantially uniform circumferential force on said second component when said actuating means is actuated.

6. The system recited in claim 5 wherein said actuating means comprises:
   a latch located at an accessible location on said closure head; and
   a connecting mechanism having a first side attached to said seal means and having a second side attached to said latch for actuating said seal means under the action of said latch.

7. The system recited in claim 1 wherein said seal means comprises a first flexible metal member having a first end attached to said first component and extending across said first annulus terminating in a second end which may selectively contact said second component; and
   wherein said actuating means comprises a connecting mechanism having a first side attached to said first flexible member and having a second side attached to a latch located on said closure head, the arrangement being such that said actuating means may operate to selectively move said first flexible metal member into contact with said second component to thereby seal said first annulus.

8. The system recited in claim 7 wherein said first flexible metal member has slots therein extending from said second end to near said first end for allowing circumferential expansion of said first flexible metal member without developing high stresses therein.

9. The system recited in claim 8 wherein said seal means further comprises:

an elastomer layer disposed on said first flexible metal member covering said slot to prevent leakage therethrough while allowing said expansion and improving the seal between said first end and said first component and between said second end and said second component.

10. The system recited in claim 9 wherein said seal means further comprises:

a first ring attached to said first end of said first flexible metal member for increasing the tension in said first flexible metal member when activated by said actuating means thereby causing said second end of said first flexible member to be in a non-contacting relationship with said second component when said actuating means is not actuated; and a second ring attached to said second end of said first flexible metal member for applying a substantially uniform circumferential force on said second component when said actuating means is actuated.

* * * * *

UNITED STATES PATENT OFFICE
CERTIFICATE OF CORRECTION

Patent No. 4,078,969　　　　　　　　　Dated　March 14, 1978

Inventor(s)　John Garin

It is certified that error appears in the above-identified patent and that said Letters Patent are hereby corrected as shown below:

On the six (6) sheets of drawings change the patent number "7,078,969" to --4,078,969--.

*Signed and Sealed this*

*Twenty-second* Day of *August 1978*

[SEAL]

Attest:

RUTH C. MASON
*Attesting Officer*

DONALD W. BANNER
*Commissioner of Patents and Trademarks*